F. R. KUNKEL.
DYNAMO ELECTRIC MACHINE.
APPLICATION FILED DEC. 29, 1909.
1,123,319.
Patented Jan. 5, 1915.
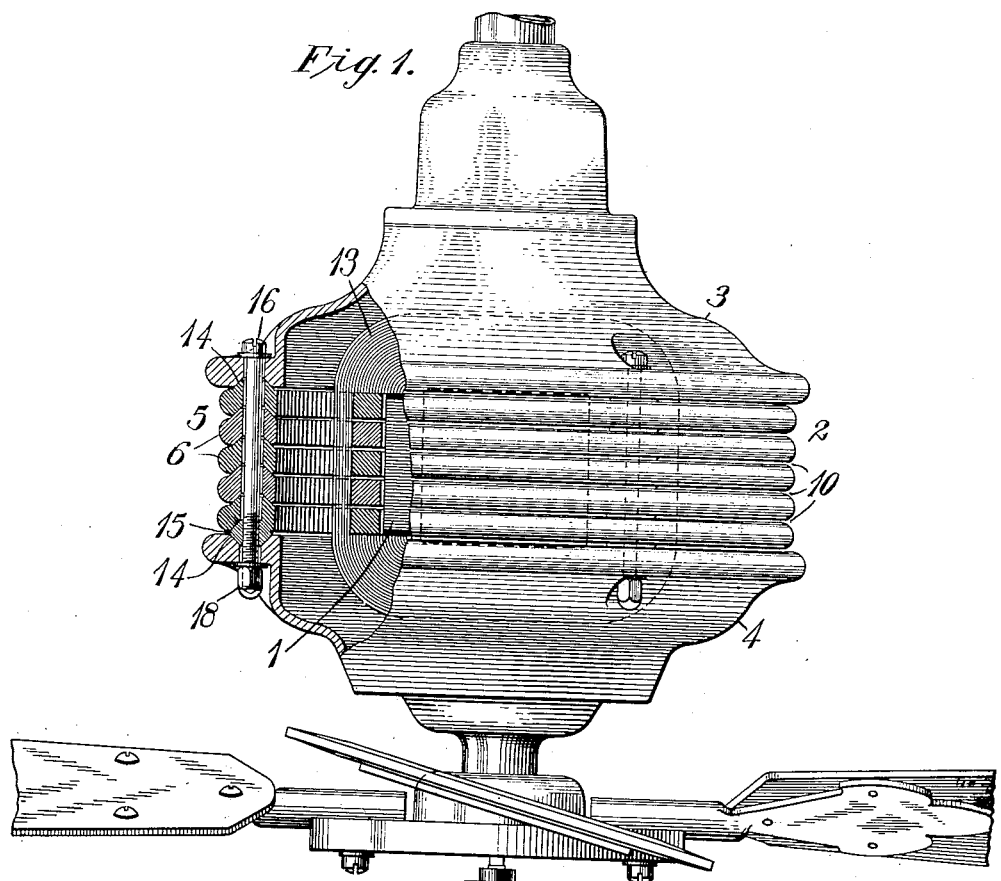
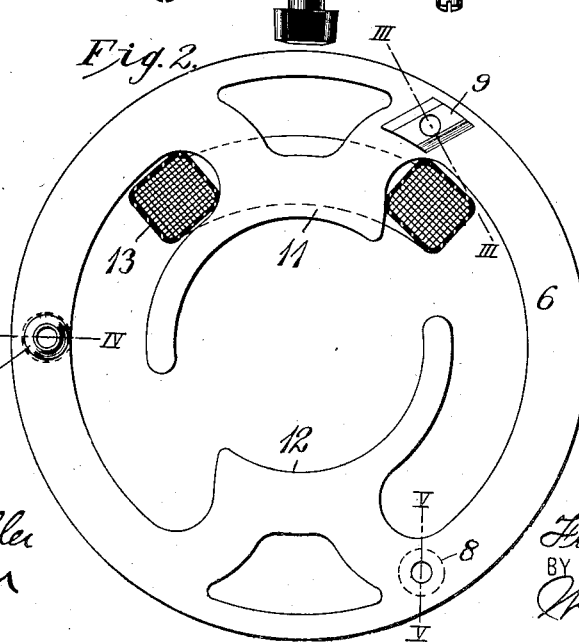
WITNESSES:
Fred H. Miller
INVENTOR
Fred R. Kunkel
BY
Wesley L. Carr
ATTORNEY

UNITED STATES PATENT OFFICE.

FRED R. KUNKEL, OF EDGEWOOD PARK, PENNSYLVANIA, ASSIGNOR TO WESTINGHOUSE ELECTRIC AND MANUFACTURING COMPANY, A CORPORATION OF PENNSYLVANIA.

DYNAMO-ELECTRIC MACHINE.

1,123,319.  Specification of Letters Patent.  Patented Jan. 5, 1915.

Application filed December 29, 1909. Serial No. 535,401.

*To all whom it may concern:*

Be it known that I, FRED R. KUNKEL, a citizen of the United States, and a resident of Edgewood Park, in the county of Allegheny and State of Pennsylvania, have invented a new and useful Improvement in Dynamo-Electric Machines, of which the following is a specification.

My invention relates to dynamo-electric machines, and it has special reference to the core and frame structures of fan motors and other small machines of this class.

The object of my invention is to provide a simple and inexpensive field magnet structure that shall require no machining and that shall embody air ducts for ventilation and a large outer surface for radiation and also comprise a minimum number of parts.

The field magnet members of small direct current motors are usually made of cast iron and require considerable machine work before they are ready for assembling and their end brackets are also machined to some extent.

According to my invention, I construct the main body portion of the field magnet core and frame of a series of similar flat castings which are provided with registering projections and recesses to space them apart for ventilation, and with three points of contact which establish and maintain their relative positions. The castings also coöperate with the end brackets in such a manner that no machine work is required on any part of the field magnet structure except such as may be necessary to provide suitable shaft bearings in the end bells.

Figure 1 of the accompanying drawings is a partially sectional elevation of a ceiling fan motor having a field magnet constructed in accordance with my invention. Fig. 2 is a detail view of one of the parts of the structure shown in Fig. 1, and Figs. 3, 4 and 5 are, respectively, sectional views on lines III—III, IV—IV and V—V of Fig. 2.

Referring to the drawings, the structure here shown comprises an armature or rotor 1, which is rotatable on a vertical axis, and a field member or stator 2 comprising end frames 3 and 4 and a field magnet core structure 5 which is composed of a plurality of relatively thin castings 6. Each of the castings 6 is provided with a frusto-conical projection 7, a boss 8 and a trapezoidal projection 9 upon one side near its periphery.

The castings are correspondingly recessed directly opposite the projections, so that, when they are assembled side by side, a projection of one casting rests in a corresponding recess of the adjacent casting, as shown in Fig. 1. The outer edges of the castings are preferably rounded in order to improve the appearance of the device by rendering its irregularities inconspicuous. A larger heat radiating surface is also provided by this means.

The frusto-conical projection 7 of one plate and the corresponding recess of the next adjacent plate serve to fix one point of engagement between the two, irrespective of the irregularity of the castings. The central plane of the trapezoidal projection 9, if extended, would bisect the frusto-conical projection, and the recess in which the former projection rests is so proportioned that the projection is readily seated without tending to pull the frusto-conical projection out of its seat, even if the two projections and recesses are not spaced accurately. Finally, the boss 8 rests against the face of the adjacent plate and establishes the third point of engagement. It is therefore evident that relative movement between the plates in any direction is prevented in the assembled structure.

The sizes and arrangement of the projections and recesses are such that, when the castings are assembled, ventilating ducts or passages 10 are provided through the core structure. The form of the castings is such as to produce a pair of opposite polar projections 11 and 12 on which suitable field magnet coils 13 are mounted. However, the number and form of the polar projections constitute no part of my present invention, and may be varied as desired.

Since it is my desire and intention to avoid all machine work upon the field magnet frame and core structure, it is important that the castings 6 shall be so assembled that a uniform air gap shall be provided between the pole piece faces and the motor armature. The desired uniformity of air gap can be insured only by so assembling the castings that corresponding points thereof shall be in exact alinement parallel to the motor axis, and such alinement is secured by providing the respective castings with unlike projections and corresponding recesses.

The end frames 3 and 4 constitute bearing housings for the shaft of the rotor 1, in the usual manner, and each of them is provided with recesses 14, which correspond, in size and location, to those on the castings which are assembled between them. The recesses 14, in the upper end frame 3, are engaged by the projections of the adjacent casting 6, and bolts 16 secure the assembled castings to this member, so that the lower end frame may be removed, as desired, to permit the inspection or removal of the rotor.

The bolts 16 extend loosely through holes 17 in the projections of the castings and nuts 15 are screwed upon their lower ends. Two of the nuts are made to correspond in form to the frusto-conical projections of the castings and the third serves merely as a spacer between the end frame and the adjacent plate. Nuts 18 are screwed upon the bolts 16 to hold the lower end frame 4 in position. Since the castings 6 are identical and are very simple in outline, they may be produced in large quantities and at a very slight expense.

By employing a considerable number of castings, the draft necessarily allowed on each is so slight that the pole faces do not need to be machined, as would otherwise be the case, in order to obtain a substantially uniform air gap between the rotating and stationary parts of the machine.

While I prefer to employ castings as above indicated, it may be found desirable to substitute relatively thick sheet iron punchings.

It is evident that various structural modifications may be effected within the spirit and scope of my invention.

I claim as my invention:

1. In a dynamo-electric machine, the combination with a rotor, of a field magnet structure comprising a plurality of similar cast plates of magnetizable material having coöperating projections and recesses for spacing the plates apart and for maintaining a fixed relation between them, and end frames having recesses corresponding to those of the plates and constituting bearing housings for the rotor shaft.

2. In a dynamo-electric machine, the combination with a rotatable armature and a field magnet structure comprising a plurality of like cast iron plates having coöperating projections and recesses and lugs for fixing their relative positions and for spacing them apart, of end frames or brackets recessed to correspond to the plates which are assembled between them.

3. In a dynamo-electric machine, the combination with a rotatable armature and a field magnet structure comprising a plurality of like cast iron plates having coöperating projections and recesses and lugs for fixing their relative positions and for spacing them apart, of an end frame or bracket constituting a bearing for the rotatable armature and recessed to receive the projections of the adjacent plate, bolts extending through the end frame and through the plates, spacing nuts coöperating with the bolts for securing the assembled plates to the end frame, and a second end frame removably secured to the assembled field magnet structures.

In testimony whereof, I have hereunto subscribed my name this 17th day of Dec., 1909.

FRED R. KUNKEL.

Witnesses:
N. M. WEBER,
B. B. HINES.